United States Patent
Kido et al.

(10) Patent No.: US 9,326,527 B2
(45) Date of Patent: May 3, 2016

(54) DEVICE AND METHOD FOR DEBONING BONE-IN LEG

(71) Applicant: MAYEKAWA MFG. CO., LTD., Koto-ku, Tokyo (JP)

(72) Inventors: Koji Kido, Tokyo (JP); Osamu Goto, Tokyo (JP); Ryuji Kodama, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 250 days.

(21) Appl. No.: 14/199,966

(22) Filed: Mar. 6, 2014

(65) Prior Publication Data

US 2015/0250193 A1 Sep. 10, 2015

(51) Int. Cl.
*A22C 17/00* (2006.01)
*A22C 21/00* (2006.01)

(52) U.S. Cl.
CPC ......... *A22C 21/0076* (2013.01); *A22C 21/0053* (2013.01)

(58) Field of Classification Search
CPC ...... A22C 17/00; A22C 17/004; A22C 17/02; A22C 17/04; A22C 21/0069; A22C 21/0076; A22B 5/0017; A22B 5/0035
USPC ......... 452/135, 136, 149–153, 155, 157, 166, 452/167
See application file for complete search history.

(56) References Cited

U.S. PATENT DOCUMENTS

| | | | | |
|---|---|---|---|---|
| 4,993,113 A | * | 2/1991 | Hazenbroek | A22C 21/0076 452/136 |
| 5,071,388 A | * | 12/1991 | Lindert | A22C 21/0076 452/155 |
| 5,173,077 A | | 12/1992 | Van Den Nieuwelaar et al. | |
| 5,401,210 A | * | 3/1995 | Manmoto | A22C 21/0076 452/127 |
| 5,713,787 A | * | 2/1998 | Schoenmakers | A22C 17/004 452/136 |
| 5,976,004 A | * | 11/1999 | Hazenbroek | A22C 21/0084 452/136 |
| 6,059,648 A | * | 5/2000 | Kodama | A22C 21/0023 452/135 |
| 6,299,524 B1 | * | 10/2001 | Janssen | A22B 5/007 452/198 |
| 7,198,564 B2 | * | 4/2007 | Hino | A22C 17/004 452/135 |
| 8,376,814 B2 | * | 2/2013 | Hattori | A22C 17/0086 452/136 |
| 8,491,362 B2 | * | 7/2013 | Kodama | A22C 21/0076 452/136 |
| 2012/0295527 A1 | | 11/2012 | Hattori et al. | |

FOREIGN PATENT DOCUMENTS

| | | |
|---|---|---|
| JP | 11333894 A | 12/1999 |
| JP | 200210732 A | 1/2002 |
| JP | 2002-171899 A | 6/2002 |
| JP | 2002-540776 A | 12/2002 |
| WO | 00/59311 A2 | 10/2000 |
| WO | 2011121899 A1 | 10/2011 |
| WO | 2012/056793 A1 | 5/2012 |

OTHER PUBLICATIONS

Office Action in JP Application No: 2012-134371, mailed Feb. 19, 2016.

* cited by examiner

*Primary Examiner* — Richard Price, Jr.
(74) *Attorney, Agent, or Firm* — Hauptman Ham, LLP

(57) ABSTRACT

In a deboning process, a knee joint length is measured in a work loading section of a first process station, and incision making of a thigh meat portion is performed in a second process station based on the measured knee joint length. At the same time, the entire length of a work is measured, and the knee joint length is calculated from previously collected data based on the measured entire length of the work. Positioning of a cutting blade and a meat separator is performed based on these values in subsequent process stations, and cutting of a tendon adhering to a knee joint and tearing of thigh meat are performed. A thigh bone is separated from a lower thigh in a further process station.

9 Claims, 12 Drawing Sheets

DEVICE AND METHOD FOR DEBONING BONE-IN LEG

RELATED APPLICATIONS

The present application corresponds to Japanese Application Number 2012-134371 filed Jun. 14, 2012, the disclosure of which is hereby incorporated by reference herein in its entirety.

BACKGROUND OF THE INVENTION

1. Field of the Invention

The present invention relates to a deboning device and a deboning method used in a deboning process of a bone-in leg of a poultry carcass or the like.

2. Description of the Related Art

A deboning process of a bone-in leg of a livestock carcass such as a poultry carcass has been conventionally developed for the purpose of saving labor, improving yield, and stabilizing the shape of deboned meat. The bone-in leg has a muscle and a tendon which firmly couple a bone portion and a meat portion in the vicinity of a knee joint, and hence it is necessary to accurately cut them. Japanese Patent Application Laid-open No. H11-333894 discloses a technique in which an incision making step of the bone-in leg of the poultry carcass is automated.

Japanese Patent Application Laid-open No. 2002-10732 discloses a deboning technique in which tearing of leg meat of a thigh of a bone-in leg of which deboning from an ankle to a knee joint is completed manually or by an existing deboning unit is automated. WO 2011/121899 discloses a deboning technique which has been developed prior to the present invention by the present inventors. In the deboning technique, a bone portion and a meat portion are separated from each other without separating an ankle, a lower thigh bone, and a thigh bone from each other, and processes from loading of the bone-in leg of the poultry carcass or the like to separation of the bone from the meat are fully automated. In the case where the bone-in log is automatically deboned, normally, the bone-in leg is suspended from a clamping device via the ankle and a plurality of deboning processes are performed while the bone-in leg is moved by the clamping device, whereby automation and labor saving are achieved.

[Patent Document 1] Japanese Patent Application Laid-open No. H11-333894

[Patent Document 2] Japanese Patent Application Laid-open No. 2002-10732

[Patent Document 3] WO 2011/121899

SUMMARY OF THE INVENTION

FIG. 12 shows a bone-in leg of a poultry carcass. The bone-in leg of the poultry carcass is formed by a lower thigh X including an ankle f and a thigh Y. A lower thigh bone k and a thigh bone j are coupled to each other by a knee joint h. In Japan, a deboning method for separating a bone portion including the ankle f, the lower thigh bone k, and the thigh bone j and a meat portion m of the lower thigh X and the thigh Y from each other has been commonly used. On the other hand, outside Japan, as shown in the drawing, it is common to separate the lower thigh X and the thigh Y from each other, separate the thigh Y into the thigh bone j and thigh meat m1, and serve the lower thigh X and the thigh meat m1 for different uses as deboned meat.

In the case of the deboning method shown in FIG. 12, the conventional deboning method adopts a method in which the thigh bone is forcibly pulled out of the thigh after the lower thigh and the thigh are separated from each other by cutting. As a result, the amount of meat remaining on the thigh bone is increased so that the yield of the meat is reduced, and the thigh meat is tubular so that a problem arises that the appearance and quality as the deboned meat are deteriorated and the thigh meat is difficult to cook. In addition, a problem arises that the lower thigh cannot be separated from the thigh by cutting accurately at the position of the knee joint so that the shape of each of the lower thigh and the thigh varies, and the yield of each of the lower thigh and the thigh is thereby reduced.

In view of the above problems of the conventional art, an object of the present invention is to implement a deboning process capable of increasing the yield of meat during cutting and forming deboned meat into an attractive shape to thereby enhance the quality and the commercial value of the deboned meat when the deboning process in which the bone-in leg is separated into the lower thigh and the thigh and the thigh is separated into the thigh meat and the thigh bone is performed. In addition, another object thereof is to implement a deboning device in which the above deboning process is automated.

In order to achieve the purposes described above, a device for deboning a bone-in leg of the present invention includes a clamping device which suspends a bone-in leg formed by a lower thigh and a thigh via an ankle and a conveying device which sequentially conveys the clamping device to a plurality of process sections, and is capable of automating a deboning process from loading of the bone-in leg to separation thereof by moving the bone-in leg to the plurality of the process sections while suspending the bone-in leg from the clamping device.

Deboning process sections of the present invention include a knee joint length measurement section which measures a knee joint length of the bone-in leg from a clamping position of the clamping device to a knee joint, a thigh incision making section which determines an incision making start point based on the joint length measured in the knee joint length measurement section and makes an incision in the thigh from the knee joint to a head of a thigh bone in a longitudinal direction, a meat portion cut section which determines a cut position based on the joint length measured in the knee joint length measurement section and separates lower thigh meat and thigh meat from each other by cutting at a part of the knee joint, a thigh meat separation section which determines a position of a meat separator based on the joint length measured in the knee joint length measurement section and tears the thigh meat from the thigh bone, and a thigh bone separation section which cuts the thigh bone from the lower thigh.

In the present invention, since the thigh incision making section makes the incision in the thigh from the knee joint to the head of the thigh bone in the longitudinal direction, the thigh meat after separation does not become tubular but is opened, and hence it is possible to form the thigh meat into an attractive shape as deboned meat, and enhance the quality and the commercial value thereof. In addition, since the positions of an incision making blade and a cutting blade with respect to the bone-in leg are determined in each process section based on the joint length measured in the knee joint length measurement section, it is possible to accurately position the incision making blade and the cutting blade. Consequently, the shape of each of the lower thigh and the thigh does not vary, and it is possible to improve the yield of each of the lower thigh and the thigh.

In the device of the present invention, the knee joint length measurement section preferably includes a bending member which bends the bone-in leg at the knee joint, a measuring member which descends from the clamping position of the clamping device to an inside part of the knee joint bent by the bending member, and a measuring unit which measures a descent amount of the measuring member. With this, by using the clamping position as a reference, bending the knee joint, and measuring the bent part, it is possible to easily measure the knee joint length.

In the device of the present invention, the conveying device preferably includes a mechanism which allows ascent and descent of the clamping device, and the knee joint length measurement section preferably includes a measuring member which comes in contact with a surface of the bone-in leg, an entire length measuring unit which measures a lower end position of the bone-in leg from two-dimensional coordinates of the measuring member which fluctuate in response to the ascent and the descent of the clamping device, and measures an entire length of the bone-in leg from the clamping position of the clamping device and the lower end position of the bone-in leg, and a knee joint length calculating unit which calculates the knee joint length from the entire length of the bone-in leg measured in the entire length measuring unit and collected data on a ratio between a length of the lower thigh and a length of the thigh.

Thus, by allowing the ascent and the descent of the clamping device, it becomes possible to perform the deboning process with the fixed heights of the cutting blade and the meat separator in each process section. As a result, a control device which controls the operations of the cutting blade and the meat separator in each process section can be simplified and reduced in cost. In addition, by controlling the height of the clamping device, it is possible to accurately perform positioning of the bone-in leg. Further, it is possible to accurately measure the knee joint length and the entire length of the bone-in leg, and hence, by using these measured values in positioning of the cutting blade and the meat separator in subsequent steps, it is possible to eliminate variations in the shape of each of the lower thigh and the thigh after separation and improve the yield of the meat.

In the device of the present invention, the thigh bone separation section preferably sets a start point and an end point of the meat separator from the entire length of the bone-in leg measured in the entire length measuring unit and the knee joint length determined in the knee joint length calculating unit. With this, it is possible to accurately position the start point and the end point of the meat separator, and hence it is possible to perform the separation of the thigh without any trouble.

In the device of the present invention, the thigh bone separation section preferably includes amount on which the bone-in leg is placed in a state where the thigh bone is bent relative to the lower thigh, a fixing member which fixes the bone-in leg placed on the mount from both sides, and a cutting blade which travels between the fixing member and the mount and cuts the thigh bone from the bone-in leg. In this manner, the thigh bone is cut in a state where the bone-in leg is fixed using the mount and the fixing member, and hence it is possible to accurately cut the thigh bone.

A method for deboning a bone-in leg of the present invention performs a deboning process while suspending the bone-in leg formed by a lower thigh and a thigh via an ankle, and the method includes a knee joint length measurement step of measuring a knee joint length of the bone-in leg from a clamping position of a clamping device to a knee joint, a thigh incision making step of determining an incision making start point based on the knee joint length measured in the knee joint length measurement step and making an incision in the thigh from the knee joint to a head of a thigh bone in a longitudinal direction, a meat portion cut step of determining a cut position based on the knee joint length measured in the knee joint length measurement step and separating lower thigh meat and thigh meat from each other by cutting at a part of the knee joint, a thigh meat separation step of determining a position of a meat separator based on the knee joint length measured in the knee joint length measurement step and tearing the thigh meat from the thigh bone, and a thigh bone separation step of cutting the thigh bone from the lower thigh.

In the method of the present invention, since the thigh incision making section makes the incision in the thigh from the knee joint to the head of the thigh bone in the longitudinal direction, the thigh meat after separation does not become tubular but is opened, and hence it is possible to form the thigh meat into an attractive shape as deboned meat, and enhance the quality and the commercial value thereof. In addition, since the positions of the incision making blade and the cutting blade with respect to the bone-in leg are determined in each process section based on the joint length measured in the knee joint length measurement section, it is possible to accurately position the incision making blade and the cutting blade. Consequently, the shape of each of the lower thigh and the thigh does not vary, and it is possible to improve the yield of each of the lower thigh and the thigh.

In the method of the present invention, the knee joint length measurement step preferably includes a bending step of bending the bone-in leg at the knee joint, and a measurement step of causing a measuring bar to descend from the clamping position of the clamping device to an inside part of the bent knee joint and measuring a descent amount of the measuring bar. With this, by using the clamping position as the reference, bending the knee joint, and measuring the bent part, it is possible to easily measure the knee joint length.

In the method of the present invention, the knee joint length measurement step preferably includes a first step of bringing a measuring member into contact with a surface of the bone-in leg, a second step of measuring an lower end position of the bone-in leg from two-dimensional coordinates of the measuring member which fluctuate in response to ascent and descent of the clamping device, a third step of measuring an entire length of the bone-in leg from the clamping position of the clamping device and the measured lower end position of the bone-in leg, and a fourth step of calculating the knee joint length from the measured entire length of the bone-in leg and collected data on a ratio between a length of the lower thigh and a length of the thigh, and the thigh incision making step and the knee joint length measurement step are preferably performed simultaneously while the bone-in leg is lifted.

With this, it is possible to simplify the process step and accurately measure the knee joint length and the entire length of the bone-in leg. By using these measured values in positioning of the cutting blade and the meat separator in subsequent steps, it is possible to eliminate variations in the shape of each of the lower thigh and the thigh after separation and improve the yield of the meat.

In the method of the present invention, the meat portion cut step preferably includes a step of cutting a tendon which connects an inside part of the knee joint and the thigh meat. The strong tendon which connects the inside part of the knee joint and the thigh meat is present in the inside part of the knee joint, and hence, by cutting the tendon, it becomes easy to separate the lower thigh and the thigh from each other by cutting.

According to the present invention, since the incision is made in the thigh from the knee joint to the head of the thigh bone, the thigh meat after the separation does not become tubular but is opened, and hence it is possible to enhance the quality and the commercial value of the thigh meat as deboned meat, and accurately position the cutting blade and the meat separator at each process step. As a result, the shape of each of the lower thigh and the thigh does not vary, and it is possible to improve the yield of each of the lower thigh and the thigh. In addition, it is possible to implement the device in which the deboning process shown in FIG. 12 is fully automated.

DESCRIPTION OF THE PREFERRED EMBODIMENTS

Figure 1:
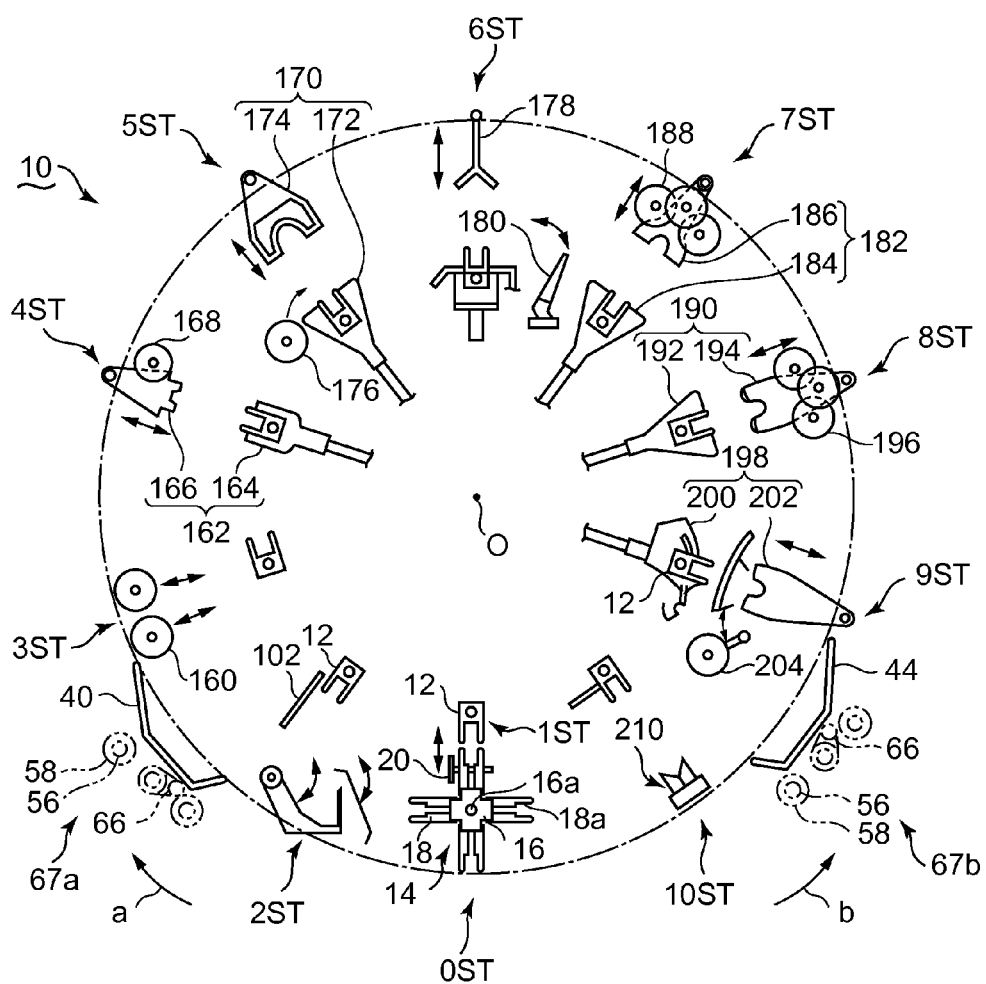
FIG. 1 is an overall structural view schematically showing a deboning device according to an embodiment in which the present invention is applied to a deboning process of a bone-in leg of a poultry carcass.

Hereinbelow, the present invention will be described in detail by using an embodiment shown in the drawings. Note that the scope of the present invention is not limited only to dimensions, materials, shapes, and relative arrangements of constituent parts described in the embodiment unless specifically described.

One embodiment in which the present invention is applied to a deboning process of a bone-in leg of a poultry carcass will be described based on FIGS. 1 to 11. FIG. 1 is a view schematically showing an overall structure of a deboning device 10. The deboning device 10 is an automatic deboning device configured to be capable of executing the deboning method disclosed in WO 2011/121899 (hereinafter referred to as a "prior deboning method 1") and a deboning method of the present invention. The deboning device 10 is configured by one assembly in which process stations which perform steps from loading of a bone-in leg (hereinafter referred to as a "work") to the final step are disposed circularly at regular intervals. An ankle f of a work w is clamped by a clamping device 12, and the work w is moved between the process stations while being suspended from the clamping device 12.

The deboning device 10 in the present embodiment is a deboning device for a left leg, and the individual process stations are disposed sequentially from a first process station 1ST in a direction of an arrow a. On the other hand, in the case of a deboning device for a right leg, the individual stations are disposed sequentially from the first process station 1ST in a direction of an arrow b.

The work w is loaded into a loading device 14 (zero process station 0ST) provided in the first process station 1ST. The loading device 14 includes a rotor 16 which intermittently rotates about a vertical shaft 16a, four suspending brackets 18 provided on the outer peripheral surface of the rotor 16 at regular intervals of 90°, and a pusher 20 provided on a side opposing the clamping device 12. The rotor 16 performs intermittent rotation in which the rotor 16 intermittently rotates 90° each time, and the movement is in synchronization with intermittent stepping of the clamping device 12. The suspending bracket 18 is formed with a concave part 18a which is opened outwardly and the ankle f of the work w is inserted into the concave part 18a. An operation of suspending the work w from the concave part 18a may be performed manually by an operator or may also be performed by an automatic mounting device.

The suspending bracket 18 from which the work w is suspended is provided with a knee joint length measuring device 80 at a position of the suspending bracket 18 when the suspending bracket 18 rotates 90°, and a length (knee joint length $L_N$) from immediately below the clamping position of the ankle f to a knee joint h is measured by the knee joint length measuring device 80. Note that, in the case where the prior deboning method is performed, the measurement of the knee joint length $L_N$ is not performed at this point, and only an operation of moving the work w to the clamping device 12 is performed.

Next, the work w is rotated 90° and is moved to the clamping device 12. The work w suspended from the clamping device 12 is moved from the first process station 1ST to a second process station 2ST. In the second process station 2ST, an incision making blade is positioned based on the measured knee joint length $L_N$, and incision making of a thigh Y of the work w is performed and, at the same time, the measurement of the entire length of the work w is performed. On the other hand, in the case where the prior deboning method is performed, the incision making over the entire length of the work from immediately below the clamping position to the head of a thigh bone and the measurement of the entire length of the work w are performed.

In the present embodiment, at each of a third process station 3ST and a fourth process station 4ST, no process is performed on the work w, and the work w is caused to pass through these process stations. In the case where the prior deboning method is performed, in the third process station 3ST, a tendon around the ankle immediately below the clamping position is cut. In the fourth process station 4ST, a small-bone muscle adhering to the outer periphery of a lower thigh bone k is cut. In a fifth process station 5ST, an inside muscle of the knee joint is cut in the present embodiment. In the case where the prior deboning method is performed, the work w is lifted while the meat portion is held by a meat separator, and the knee joint h is thereby exposed.

In the present embodiment, no process is performed on the work w in a sixth process station 6ST, and the work w is caused to pass through the sixth process station 6ST. In the case where the prior deboning method is performed, at this point, the position of the knee joint is measured and, at the same time, an X-muscle adhering to the knee joint h is cut. In each of a seventh process station 7ST and an eighth process station 8ST, an outside muscle and a cartilage of the knee joint are cut in the present embodiment. In the case where the prior deboning method is performed, similarly, a meat portion m is torn from the knee joint h using the meat separator while cutting the outside muscle and the cartilage of the knee joint.

In a ninth process station 9ST, thigh meat m1 is separated from a thigh bone j and discharged in the present embodiment. In the case where the prior deboning method is performed, the meat portion is separated from the thigh bone j. In a tenth process station 10ST, the thigh bone j is separated from the lower thigh bone k, and a lower thigh X and the thigh bone j which are separated are discharged in the present embodiment. In the case where the prior deboning method is performed, the remaining bone portion (a portion in which the ankle, the lower thighbone k, and the thigh bone j are together) is dropped from the clamping device 12 and discharged.

Figure 2:
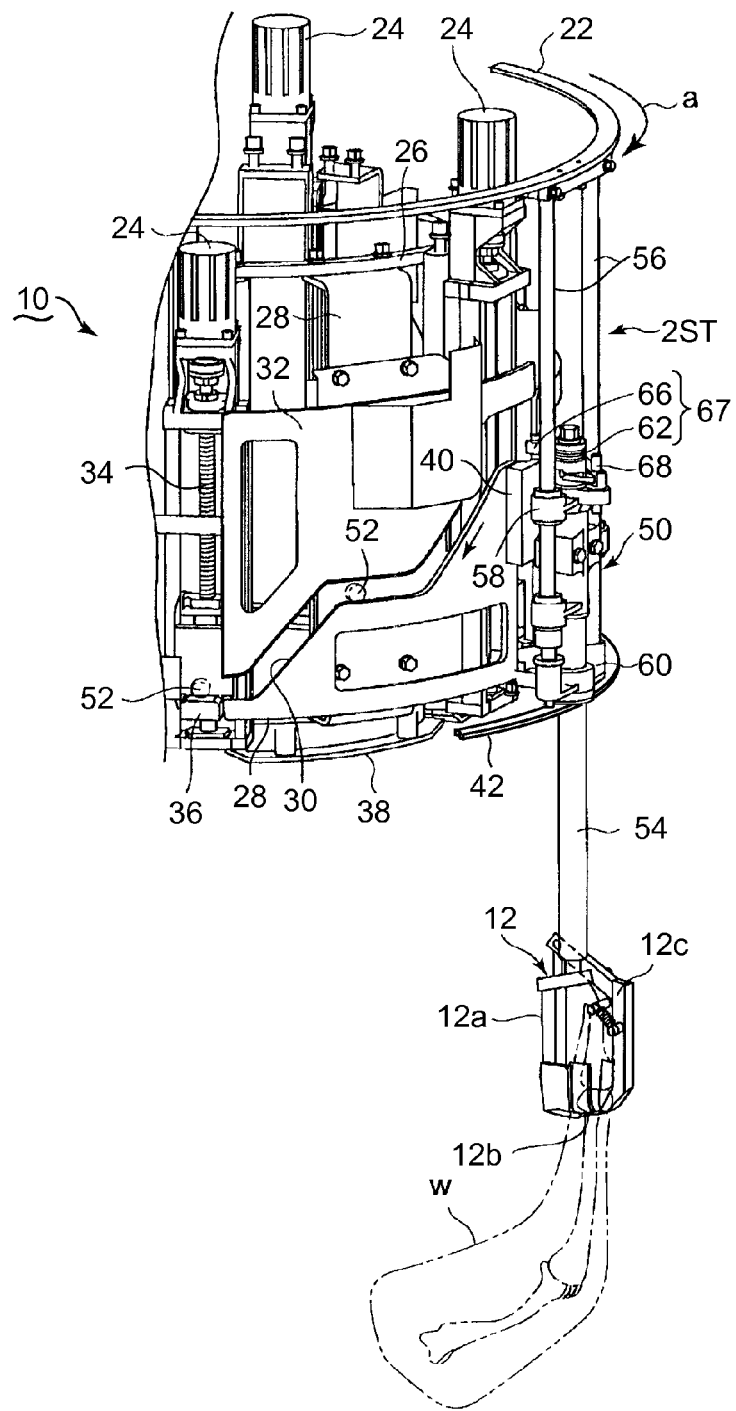
FIG. 2 is a perspective view showing a part of the deboning device according to the embodiment.

Next, the configuration of the deboning device 10 will be described with reference to FIGS. 2 to 5. As shown in FIG. 2, the clamping device 12 is attached to the lower end of a lift shaft 50. The lift shaft 50 is attached to circular conveying rings 22 and 42 provided in the upper and lower parts of the deboning device 10. The conveying rings 22 and 42 intermittently rotate about a rotation center O (see FIG. 1) of the deboning device 10 in a direction of an arrow a. Accordingly, the clamping device 12 moves between the process stations while moving along a circular locus with the rotation center O as the center, and temporarily stops at each process station. Ascent and descent of the clamping device 12 at each process station are performed using a servomotor 24 provided at each process station.

Circular support beams 26 are provided at the upper and lower parts of the deboning device 10, and a support frame 28 is attached to the support beams 26. To the support frame 28, the servomotor 24 and an outer plate 32 are attached. The outer plate 32 is provided with a guide groove 30 in which a lift roller 52 provided in the lift shaft 50 runs. The clamping device 12 is attached to the lower end of a rotation shaft 54 constituting the lift shaft 50. The clamping device 12 is formed by a clamping part 12a having a groove 12b into which the ankle f of the work w is inserted, and a chuck 12c which opens and closes the groove 12b. The opening and closing operations of the chuck 12c are controlled by a controller 150 (see FIG. 8) which controls the operation of the deboning device 10.

Figure 3:
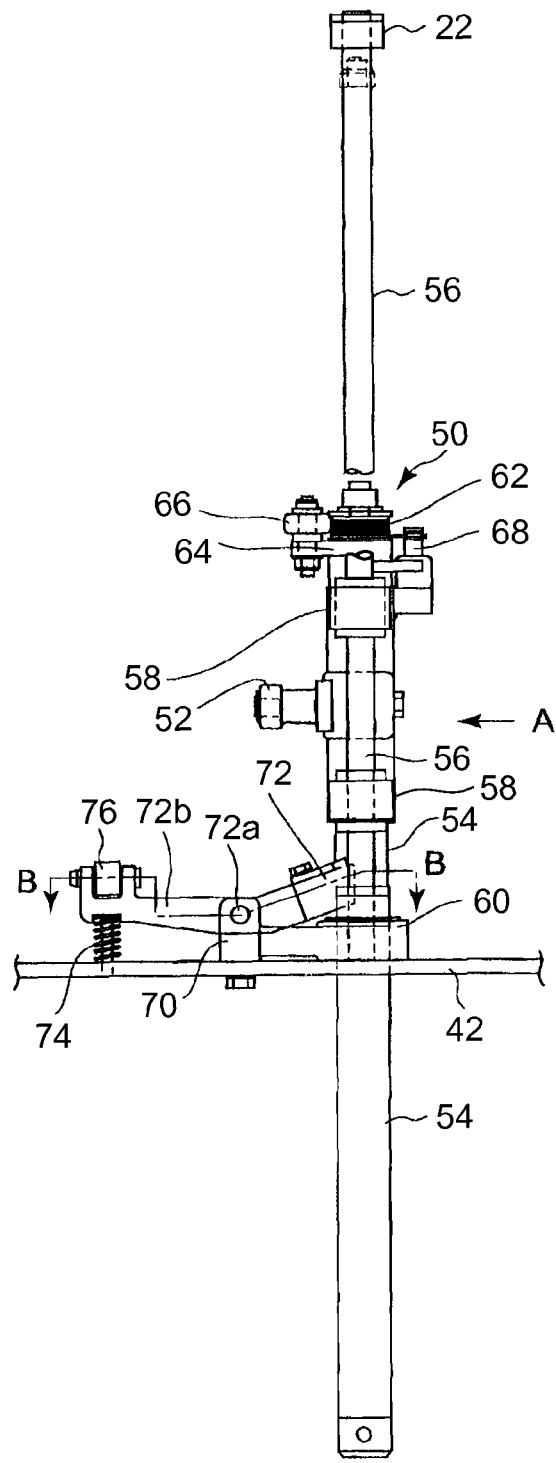
FIG. 3 is a front view of a lift shaft of the deboning device according to the embodiment.
Figure 4:
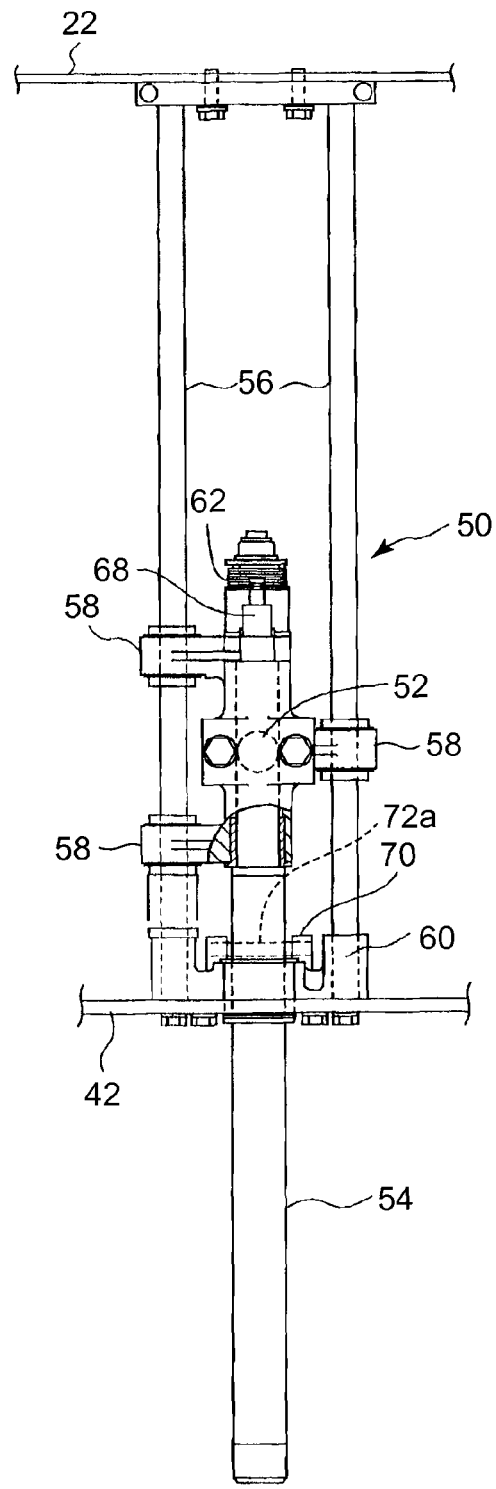
FIG. 4 is a side view as viewed from an A direction in FIG. 3.
Figure 5:
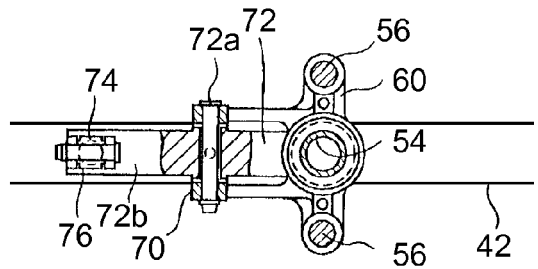
FIG. 5 is a cross-sectional view taken along the line B-B in FIG. 3.

As shown in FIGS. 3 to 5, the lift shaft 50 is configured by a pair of guide bars 56 having upper ends coupled to the conveying ring 22, slide brackets 58 which are loosely fitted in the guide bars 56 and are slidable along the guide bars 56, and the rotation shaft 54 which is loosely fitted in holes formed in the slide brackets 58 and is rotatable relative to the slide brackets 58. The clamping device 12 is attached to the lower end of the rotation shaft 54. The rotation shaft 54 vertically moves together with the slide brackets 58. The circular conveying ring 42 similar to the conveying ring 22 is provided in the lower part of the deboning device 10, and the lower end of each guide bar 56 is attached to the conveying ring 42 via a fixture 60. The conveying rings 22 and 42 are intermittently rotated by a predetermined angle by a driving device (not shown).

The first to tenth process stations 1ST to 10ST are disposed at regular intervals of a predetermined angle relative to the rotation center O. Although FIG. 2 shows only one clamping device 12, in the actual device, a plurality of the lift shafts 50 are attached to the conveying rings 22 and 42 at regular intervals such that one clamping device 12 is disposed in each process station.

A coil spring 62 is wound around the upper end of the rotation shaft 54, and a swing roller 66 is attached to the rotation shaft 54 at a position immediately below the coil spring 62 via an arm 64. One end of the coil spring 62 is coupled to a catch 68 formed integrally with the slide bracket 58. With this, to the rotation shaft 54, an elastic force of the coil spring 62 is applied such that the current position is maintained.

At a position below the swing roller 66, the lift roller 52 is attached to the slide bracket 58. The outer plate 32 between the process stations is formed with the guide groove 30, and the guide groove 30 functions as a travel path in which the lift roller 52 travels. When the clamping device 12 moves between the process stations, the lift roller 52 travels in the guide groove 30, whereby the position of the clamping device 12 in an up-and-down direction is determined.

As shown in FIGS. 3 and 5, a bearing 70 is provided on the upper surface of the conveying ring 42, and a brake shoe 72 is attached to the bearing 70 rotatably about a pin 72a. The brake shoe 72 is disposed slightly obliquely above a base part 72b. A coil spring 74 is provided between the base part 72b and the upper surface of the conveying ring 42, and the brake shoe 72 is pressed against the surface of the rotation shaft 54 by the elastic force of the coil spring 74. When the lift roller 52 does not travel in the guide groove 30, the brake shoe 72 is pressed against the surface of the rotation shaft 54 by the elastic force of the coil spring 74 and dropping of the clamping device 12 is thereby prevented.

In FIG. 2, a unit which lifts the work w at each station is configured by the servomotor 24, a screw shaft 34 which is provided in the up-and-down direction and is rotated by the servomotor 24, and a lift block 36 which is screwed with the screw shaft 34. The lift block 36 is caused to ascend or descend by the rotation of the screw shaft 34. The lift roller 52 having traveled in the guide groove 30 and reached the upper surface of the lift block 36 ascends together with the lift block 36 with the rotation of the screw shaft 34. When the lift roller 52 ascends, the slide brackets 58 and the rotation shaft 54 integral with the lift roller 52 ascend, and the clamping device 12 coupled to the rotation shaft 54 and the work w ascend. Ascent and descent amounts of the work w are determined by the RPM of the servomotor 24.

During the ascent of the rotation shaft 54, since the elastic force of the coil spring 74 operates on the brake shoe 72 and the brake shoe 72 is pressed against the surface of the rotation shaft 54, dropping of the rotation shaft 54 is prevented. A roller 76 is provided in the upper part of the base part 72b. In an area in which the guide groove 30 is formed so as to descend in a direction of movement of the clamping device 12 (the direction of the arrow a), a guide rail 38 is attached to the support frame 28. When the lift roller 52 travels in the guide groove 30 in this area, before the lift roller 52 enters the guide groove 30, the roller 76 goes under the lower surface of the guide rail 38, and the base part 72b is pushed downward by the guide rail 38. With the base part 72b being pushed downward, the brake shoe 72 moves away from the surface of the rotation shaft 54. With this, the descent of the rotation shaft 54 is liberated, and it becomes possible for the lift roller 52 to travel in the guide groove 30.

Figure 6A:
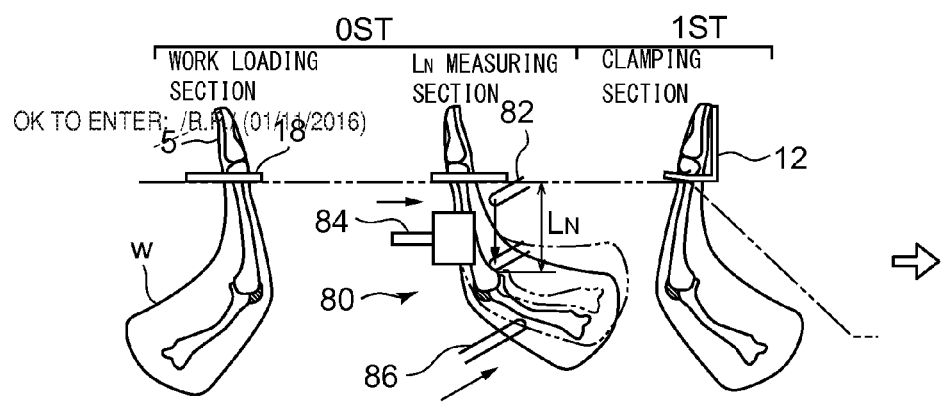
FIG. 6A is a step diagram showing a part (initial part) of a deboning process step of the embodiment.
Figure 6A:
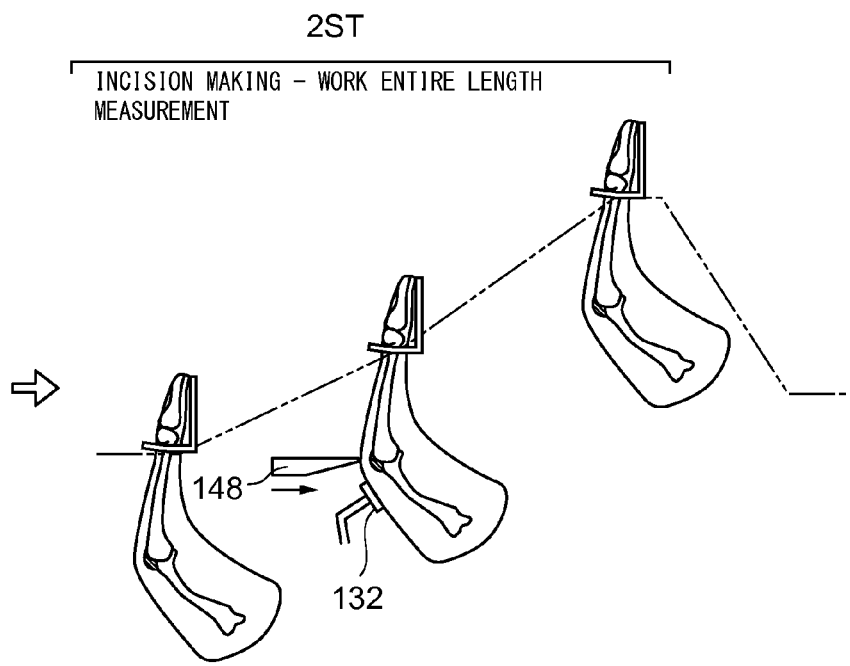

Next, the process step in each process station will be specifically described. As shown in FIG. 6A, in a work loading section (0ST) before the first process station, the knee joint length measuring device 80 is provided at the position ($L_N$ measuring section) where the suspending bracket 18 has rotated 90° from the work suspending position. The knee joint length measuring device 80 measures the length from the clamping position of the ankle f to the knee joint h (the knee joint length $L_N$).

Figure 7:
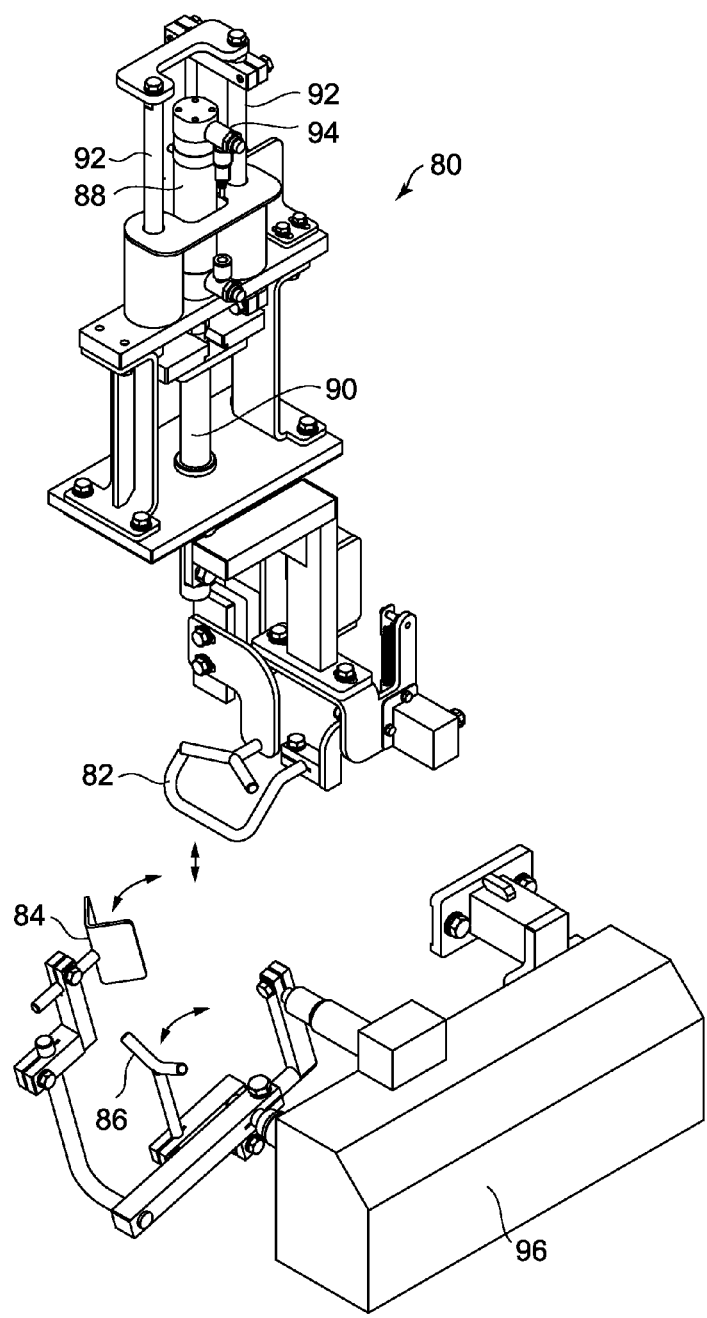
FIG. 7 is a perspective view showing a knee joint length measuring device of a zero process station of the deboning device according to the embodiment.

As shown in FIG. 7, the knee joint length measuring device 80 includes a measuring arm 82, a holding plate 84, and a bending bar 86. The measuring arm 82 is coupled to a piston rod 90 of an air cylinder 88. The measuring arm 82 is driven in the up-and-down direction by the air cylinder 88. Shafts 92 are coupled to the piston rod 90, and ascend and descend together with the piston rod 90. The ascent and descent amounts of the shafts 92 (i.e., the ascent and descent amounts of the piston rod 90) are measured by an encoder 94, whereby it is possible to measure the ascent and descent amounts of the measuring arm 82. The holding plate 84 and the bending bar 86 are caused to advance or retreat in directions of arrows by a driving device 96.

In FIG. 6A, in the $L_N$ measuring section, the lower thigh X of the work w is held using the holding plate 84, and the thigh Y is bent upward using the bending bar 86. At the same time, the measuring arm 82 disposed in the vicinity of the height of the suspending bracket 18 is caused to descend, and is pressed against the inside part of the knee joint of the work w. A difference $L_N$ between the height of the measuring arm 82 at the pressing position and the height of the suspending bracket 18 is measured, and the measured value $L_N$ is determined as the knee joint length. The suspending bracket 18 and the clamping device 12 are disposed at the same height, and the suspending bracket 18 and the clamping device 12 are configured to clamp the same part of the ankle f, and hence the measured value $L_N$ is also a difference in height between the clamping device 12 and the measuring arm 82. The measured value $L_N$ is inputted to the controller 150.

As shown in FIG. 1, the suspending bracket 18 which suspends the work w further rotates 90° to face the clamping device 12. At this point, the groove 12b of the clamping device 12 is opened. The work w is pushed toward the clamping device 12 by the pusher 20 and is moved to the clamping device 12. After the work w is moved to the clamping device 12, the chuck 12c is caused to close the entrance of the groove 12b by the controller 150. Thereafter, the clamping device 12 moves to the second process station 2ST. In the second process station 2ST, the incision making of the thigh Y and the measurement of the entire length of the work w are performed. This process step will be specifically described with reference to FIGS. 6A, 8, and 9.

As shown in FIG. 6A, in the path where the work w is moved from the first process station 1ST to the second process station 2ST, the work w is temporarily lifted. After the work w reaches the second process station 2ST, the lift amount of the work w is determined based on the knee joint length $L_N$ measured in the first process station 1ST. The work w is lifted based on the lift amount, and an incision making knife 148 is set at an incision making start point (the knee joint h). At the same time, a measuring plate 132 is brought into contact with the surface of the work. By lifting the work w in this state, the incision making in which the incision making knife 148 is caused to descend from the knee joint h along the surface of the thigh bone j in a direction of an arrow c (see FIG. 8) and the measurement of the entire length are performed at the same time. Based on the measured value of the entire length, the knee joint length $L_N$ is calculated from collected data on the ratio between the length of the lower thigh X and the length of the thigh Y. Based on the determined knee joint length $L_N$, the height of the work w in the third process station 3ST and subsequent stations is determined.

Figure 8:
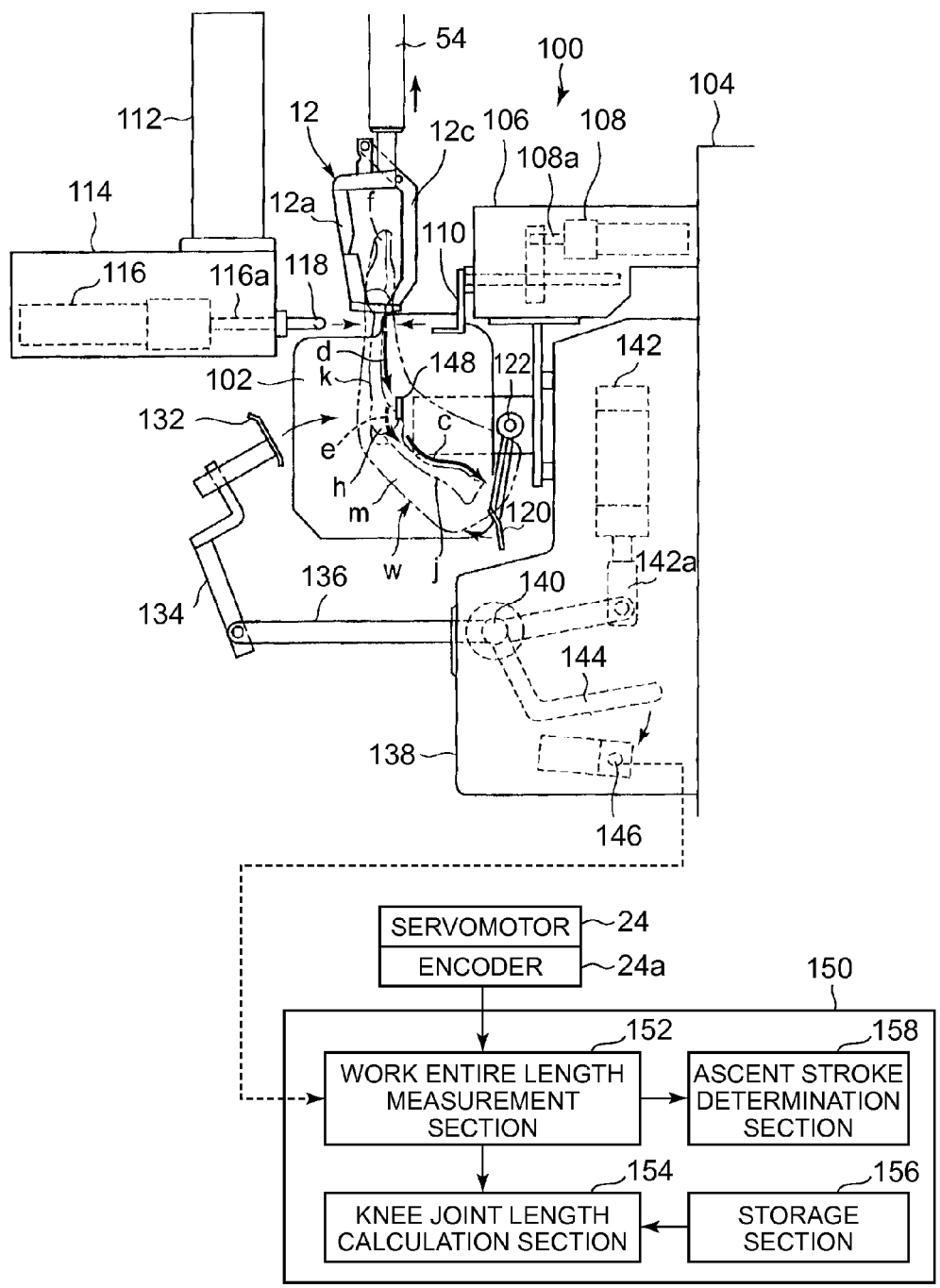
FIG. 8 is a front view of a second process station of the deboning device according to the embodiment.
Figure 9:
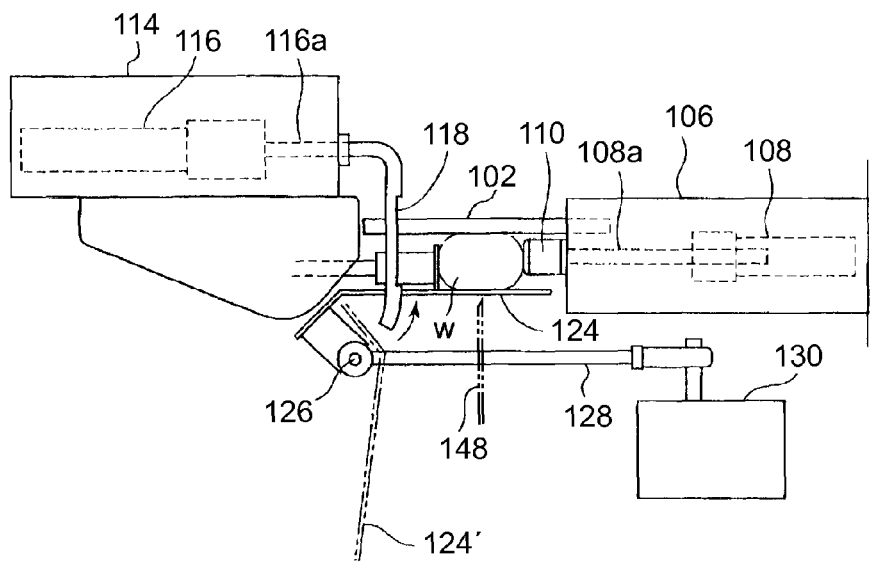
FIG. 9 is a plan view of the second process station of the deboning device according to the embodiment.

With reference to FIGS. 8 and 9, the configuration of an incision making and entire length measuring device 100 provided in the second process station 2ST will be described. An attitude maintaining plate 102 having a flat surface is provided vertically so as to block the movement path of the work w. The work w suspended from the clamping device 12 moves from the first process station 1ST, comes in contact with the attitude maintaining plate 102, and stops. An air cylinder 108 is fixed to a support plate 106 fixed to a base 104, and a pusher 110 is attached to a piston rod 108a of the air cylinder 108.

On the left side of the attitude maintaining plate 102, an air cylinder 116 is fixed to a support plate 114 fixed to a support frame 112. A pusher 118 is provided in a piston rod 116a of the air cylinder 116. A pusher 120 is provided below the pusher 110, and the pusher 120 is rotatably supported by a rotation shaft 122. The rotation shaft 122 is caused to rotate by an air cylinder (not shown) to thereby move the pusher 120 toward or away from the work w. When the work w comes in contact with the attitude maintaining plate 102 and stops, the pushers 110, 118, and 120 move toward the work w and hold the work w from three directions.

In addition, as shown in FIG. 9, a holding plate 124 is disposed at a position opposing the attitude maintaining plate 102 in the up-and-down direction. The holding plate 124 is connected to a driving device 130 via an arm 128, and is rotatable about a shaft 126. The arm 128 is driven by the driving device 130 in a direction in which the shaft 126 is rotated. When the work w comes in contact with the attitude maintaining plate 102 and stops, the holding plate 124 rotates from a position of 124' toward the work w, presses one of flat surfaces of the work w, and pushes and fixes the other flat surface of the work w against and to the attitude maintaining plate 102.

As shown in FIG. 8, the measuring plate 132 is provided below the pusher 110. The measuring plate 132 is attached to an arm 136 via an arm 134. The arm 136 is configured to be rotatable about a rotation shaft 140 provided on a support plate 138. The other end of the arm 136 is connected to a piston rod 142a of an air cylinder 142 fixed to the support plate 138. The measuring plate 132 is driven by the air cylinder 142 in a direction in which the measuring plate 132 moves toward or away from the work w. The arm 136 is integrally provided with a branch arm 144 via the rotation shaft 140, and a non-contact sensor 146 is provided below the branch arm 144. In addition, the incision making knife 148 is disposed at a position opposing the attitude maintaining plate 102 in the up-and-down direction.

In the configuration described above, when the work w comes in contact with the attitude maintaining plate 102 and stops, the pushers 110, 118, and 120 move toward the work w and hold the work w from three directions. At the same time, the holding plate 124 rotates toward the work w, pushes the flat surface of the work w, and presses and fixes the other flat surface of the work w against and to the attitude maintaining plate 102. Thereafter, the incision making knife 148 is stuck into the knee joint h of the work w, and the work w ascends together with the clamping device 12. With this, as indicated by the arrow c in FIG. 8, the incision making knife 148 descends along the surface of the thigh bone j, and cuts the thigh meat m1.

In addition, after the work w is fixed to the attitude maintaining plate 102, the measuring plate 132 moves toward the work w and comes in contact with the work w. With the ascent of the work w, the measuring plate 132 moves forward while the surface of the work w is traced with the measuring plate 132. The branch arm 144 is configured to be positioned closest to the non-contact sensor 146 when the measuring plate 132 reaches the lower end of the work w. Time when the branch arm 144 is positioned closest to the non-contact sensor 146, i.e., time when the measuring plate 132 reaches the lower end of the work w is detected by the non-contact sensor 146, and a time signal of this time is sent to a work entire length measurement section 152 of the controller 150.

On the other hand, the RPM of the servomotor 24 is detected by an encoder 24a, and a detection signal of the RPM is sent to the work entire length measurement section 152. The height of the lift roller 52 (ascent stroke) is obtained from the detected value. In the work entire length measurement section 152, the entire length of the work w is determined from a difference between the position of the measuring plate 132 and the height of the lift roller 52 when the non-contact sensor 146 detects the branch arm 144, i.e., when the measuring plate 132 reaches the lower end of the work w. A storage section 156 of the controller 150 stores pre-collected data on the ratio between the length of the lower thigh X and the length of the thigh Y. A knee joint length calculation section 154 calculates the knee joint length $L_N$ from the entire length of the work determined in the work entire length measurement section 152 and the data.

An ascent stroke determination section 158 determines which one of large, medium, and small categories the entire length of the work determined in the work entire length measurement section 152 belongs to. Subsequently, the ascent stroke corresponding to the determined category is determined, the clamping device 12 is caused to ascend by the ascent stroke in the ninth process station 9ST (final tearing), and the thigh meat m1 is torn from the thigh bone j. Note that, in the case where the deboning method 1 is performed, the incision making knife 148 is positioned immediately below the clamping position, the incision making over the entire length of the work from the ankle immediately below the clamping position to the head of the thigh bone is performed, and the measurement of the entire length of the work w is also performed with the same operations as those of the present embodiment.

Figure 13:
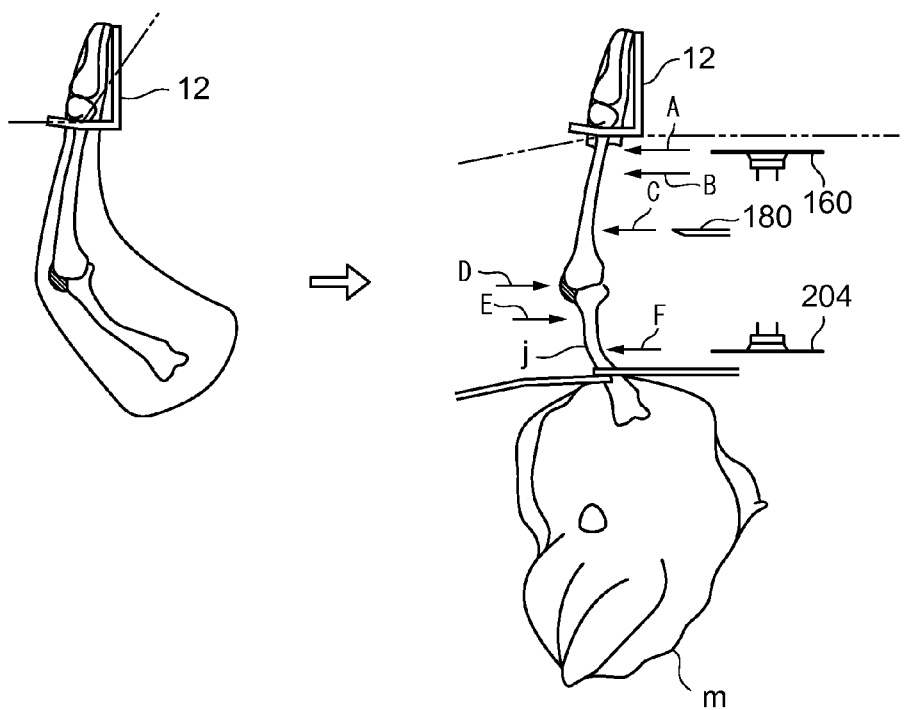
FIG. 13 is an explanatory view showing a deboning step of WO 2011/121899.

In the present embodiment, no process is performed on the work w in each of the third process station 3ST and the fourth process station 4ST, and the work w passes through these process stations. On the other hand, as shown in FIG. 13, in the case where the prior deboning method is performed, in the third process station 3ST, the tendon around the ankle immediately below the clamping portion of the work w (a position indicated by an arrow A) is cut (ankle cut) using a pair of round blade cutters 160 which are horizontally disposed. In addition, in the fourth process station 4ST, the clamping device 12 is lifted while the meat portion of the lower thigh X is held from above by a meat separator 162 including a stationary separator 164 and a movable separator 166. At the same time, small-bone muscle cut is performed using a round blade cutter 168 (a position indicated by an arrow B). With this, the lower thigh meat is torn from the lower thigh bone k.

Figure 6B:
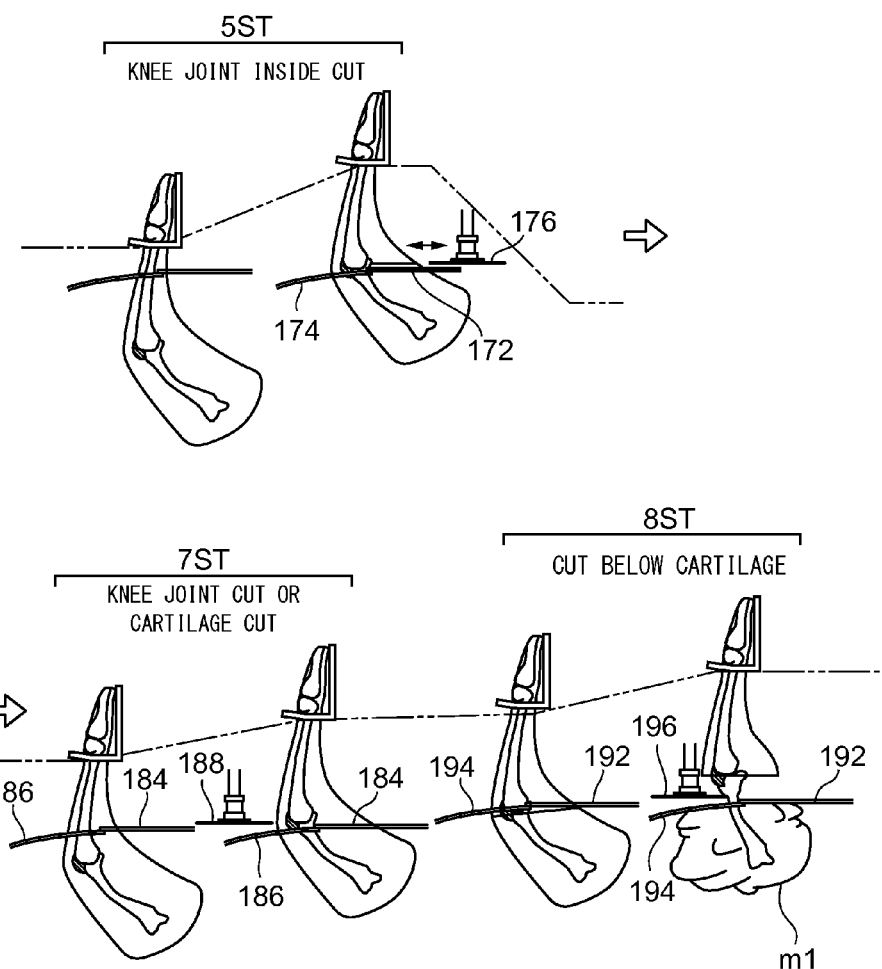
FIG. 6B is a step diagram showing a part (middle part) of the deboning process step of the embodiment.

As shown in FIG. 6B, in the fifth process station 5ST, the inside muscle of the knee joint is cut in the present embodiment. That is, the lift amount of the work w is determined based on the measured value of the knee joint length $L_N$ determined in the second process station 2ST, and the work w is lifted. As shown in FIG. 1, the meat in the inside part of the knee joint h is cut using a round blade cutter 176 while the work w is held from both sides by a meat separator 170 including a stationary separator 172 and a movable separator 174. A strong tendon which connects the knee joint h and the thigh meat m1 is present in the inside part of the knee joint h, and the tendon is cut using the round blade cutter 176. Since the lift amount of the work w is determined based on the measured value of the knee joint length $L_N$ determined in the second process station 2ST, it is possible to accurately set the knee joint h of the work w at the installation position of the round blade cutter 176. On the other hand, in the case where the deboning method 1 is performed, in the fifth process station 5ST, the work w is lifted while the meat portion is held by the meat separator 170, and the knee joint h is thereby exposed.

In the present embodiment, no process is performed on the work w in the sixth process station, and the work w passes through the sixth process station 6ST. In the case where the prior deboning method is performed, as shown in FIG. 1, the work w is lifted, the position of the knee joint h is measured using a measuring device 178 during this operation, and the X-muscle in the knee joint h is cut using a cutter 180 (a position indicated by an arrow C in FIG. 13).

In the seventh process station 7ST, the lift amount of the work w is determined based on the knee joint length $L_N$ determined in the second process station 2ST, and the work w is lifted. Subsequently, a knee joint muscle in the outside of the knee joint h is cut using round blade cutters 188 while the work w is held from both sides by a meat separator 182 including a stationary separator 184 and a movable separator 186. At this point, by using three round blade cutters 188 and cutting the front and sides of the knee joint, it is possible to cause the cartilage to adhere to the thigh meat m1. Conversely, by using two round blade cutters 188 and cutting only the sides of the knee joint without cutting the front of the knee joint, it is possible to cause the cartilage to adhere to the thigh bone j.

On the other hand, in the case where the deboning method 1 is performed, the lift amount of the work w is determined from the position of the knee joint h measured in the sixth process station 6ST, and the work w is lifted while the meat portion m is held by the meat separator 182. With this, the knee joint h is exposed, and a muscle adhering to the exposed knee joint h is cut using three round blade cutters 188 (a position indicated by an arrow D in FIG. 13).

In the eighth process station 8ST, the work w is lifted based on the knee joint length $L_N$ determined in the second process station 2ST. Subsequently, a muscle adhering to a part 3 mm below the boundary between the cartilage and the meat of the knee joint h is cut using round blade cutters 196 while the work w is held by a meat separator 190 including a stationary separator 192 and a movable separator 194. With this, separation of the thigh meat m1 from the thigh bone j is facilitated. In the case where the prior deboning method is performed, the lift amount of the work w is determined from the position of the knee joint h measured in the sixth process station 6ST, and the work w is lifted while the meat portion m is held by the meat separator 190. Subsequently, the same position as that in the present embodiment (a position indicated by an arrow E in FIG. 13) is cut using the round blade cutters 196.

Figure 6C:
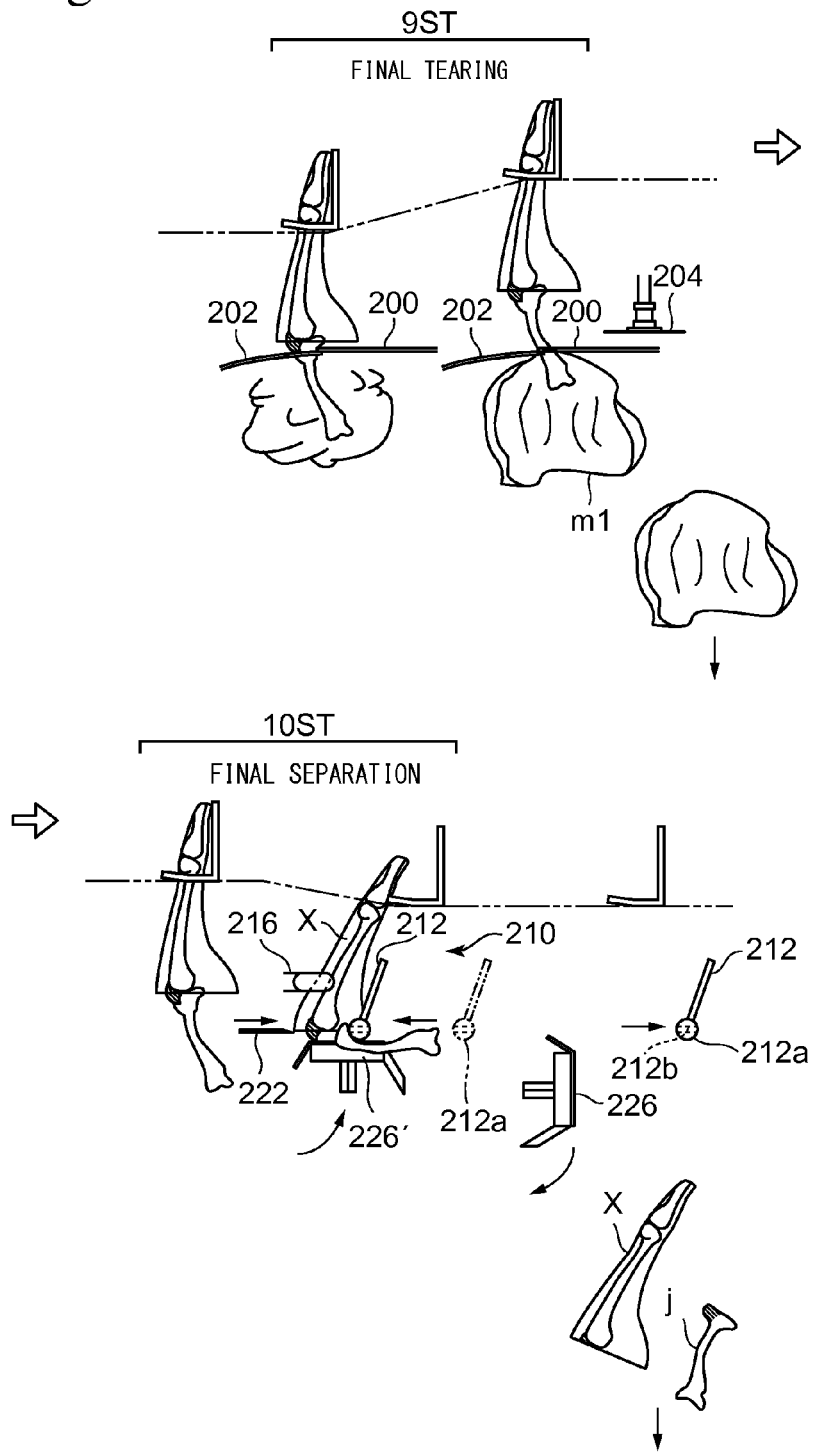
FIG. 6C is a step diagram showing a part (final part) of the deboning process step of the embodiment.
Figure 10:
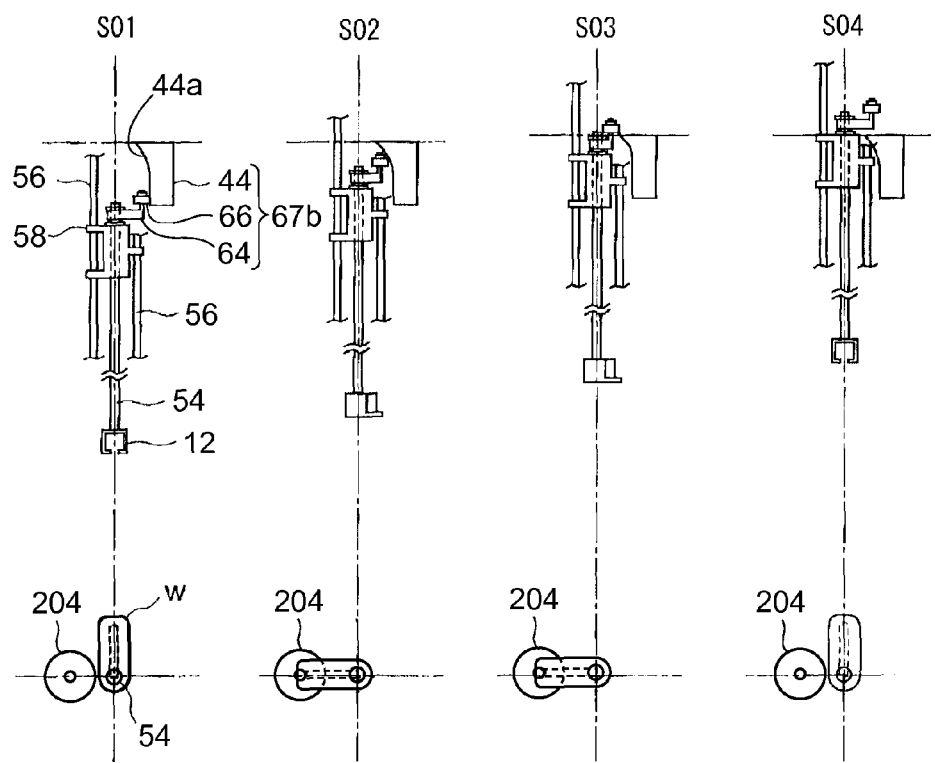
FIG. 10 is an explanatory view showing an operation in a sixth process station of the deboning device according to the embodiment.
Figure 11:
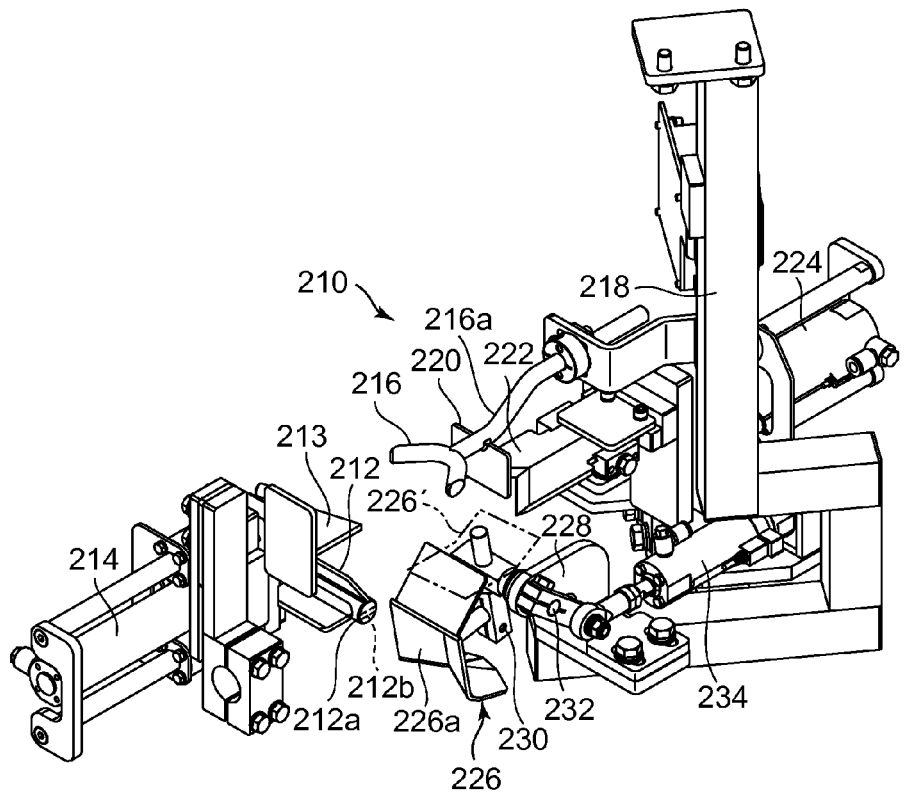
FIG. 11 is a perspective view showing a thigh bone cutting device in a tenth process station of the deboning device according to the embodiment.
Figure 12:
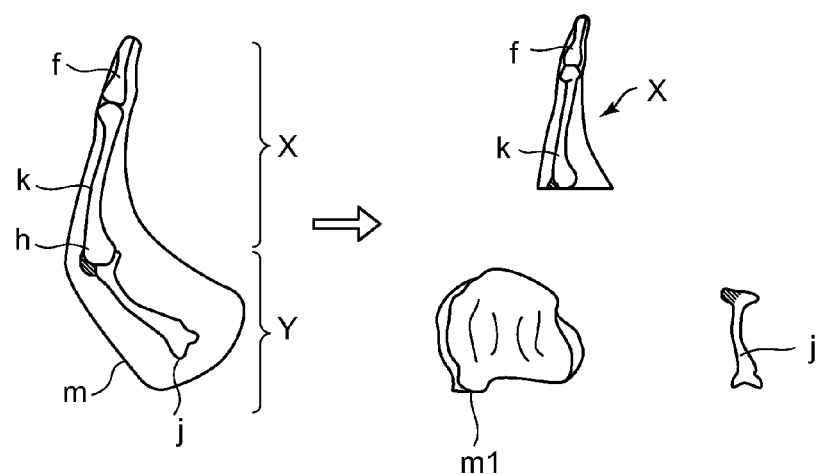
FIG. 12 is an explanatory view showing a method for separating a bone-in leg.

As shown in FIG. 6C, in the ninth process station 9ST, final tearing of the thigh meat m1 is performed in the present embodiment. The work w is lifted while the thigh meat m1 is held by a meat separator 198 including a stationary separator 200 and a movable separator 202. The lift amount is determined based on the measured value of the entire length of the work determined in the second process station 2ST. To the outer plate 32 of the ninth process station 9ST, a cam plate 44 is attached. As shown in FIG. 10, the cam plate 44 is formed with a cam surface 44a with which the swing roller 66 comes in contact and rotates by a set angle. The swing roller 66, the coil spring 62, and the cam plate 44 constitute a rotation mechanism 67b.

In FIG. 10, S01 indicates the upstream side in the direction of movement of the clamping device 12, and S04 indicates the downstream side in the direction of movement of the clamping device 12. The swing roller 66 comes in contact with the cam surface 44a, whereby it is possible to cause the clamping device 12 to rotate 90°. Thereafter, the swing roller 66 returns to the original position with the elastic force of the coil spring 62. During this operation, it is possible to cut the tendon adhering to the head of the thigh bone j using a round blade cutter 204. In this manner, it is possible to tear the thigh meat m1 from the thigh bone j. The separated thigh meat m1 is dropped into a discharge path (not shown) and discharged. In the case where the prior deboning method is performed as well, the similar operation is performed at this point, and the tendon adhering to the head of the thigh bone j is cut using the round blade cutter 204 during the rotation of the work w (a position indicated by an arrow F in FIG. 13). In the deboning method 1, the meat portion m is torn and dropped at this point.

Note that, in the deboning device 10, by attaching a cam plate 40 having the same configuration as that of the cam plate 44 to the outer plate 32 of the second process station 2ST, a rotation mechanism 67a is configured by the swing roller 66, the coil spring 62, and the cam plate 40. In the case where the prior deboning method is performed, in the second process station 2ST, the incision making over the entire length of the work from the ankle immediately below the clamping position to the head of the thigh bone is performed. That is, as shown in FIG. 8, the incision making indicated by a line d is performed along the surface of the lower thigh bone k and, when the incision making knife 148 descends to the position of the knee joint h, the clamping device 12 is rotated by a predetermined angle with the contact of the swing roller 66 with the cam surface of the cam plate 40. With this, the incision making knife 148 is moved from the inside of the knee joint h to the backside thereof. That is, the incision making along lines d→e→c dec shown in FIG. 8 is performed. With this, it is possible to reliably cut the tendon adhering to the knee joint h.

In the tenth process station 10ST, a thigh bone cutting device 210 which separates the thigh bone j is provided in the present embodiment. Hereinbelow, the configuration of the thigh bone cutting device 210 will be described with reference to FIG. 11. A holding plate 212 and a Y-shaped bar 216 for holding the work in the shape of Y are disposed on both sides of the work w having moved to the tenth process station 10ST. A cylindrical base part 212a integrally formed with the lower part of the holding plate 212 is provided with an elongated hole 212b through which a cutting blade 222 described later projects and extends. The holding plate 212 is caused to project forward by an air cylinder 214.

The Y-shaped bar 216 is disposed to oppose the holding plate 212, and is fixed to a support frame 218. Slightly behind the Y-shaped bar 216, a holding plate 220 is attached to a support bar 216a of the Y-shaped bar 216. Below the holding plate 212 and the Y-shaped bar 216, the plate-like cutting blade 222 is disposed in a horizontal direction. The cutting blade 222 can be caused to project forward by an air cylinder 224. A mount 226 is provided below the holding plate 212 and the Y-shaped bar 216. The mount 226 has a receiving surface 226a inclined upward on both sides such that the work w can be stably placed thereon. The mount 226 is attached to a shaft 230 rotatably attached to a frame 228. The shaft 230 is coupled to an air cylinder 234 via an arm 232. When the work w has moved to the tenth process station 10ST, the mount 226 is at the position of 226', and the receiving surface 226a is directed upward.

When the work w has moved to a position above the mount 226, the clamping device 12 is opened by the controller 150. At the same time, the mount 226 ascends, the holding plate 212 moves forward together with the base part 212a, and the mount 226, the holding plate 212, and the Y-shaped bar 216 fix the work w in a state where the thigh bone j is bent so as to form an L shape with the lower thigh X. In this state, the cutting blade 222 moves forward and cuts the knee joint h. After cutting the thigh bone j, the cutting blade 222 enters into the elongated hole 212b. Next, the cutting blade 222 retreats, the base part 212a retreats, and the mount 226 rotates 90°. With this, the lower thigh X and the thigh bone j which are separated from each other are dropped. A bone discharge guide 213 is provided above the holding plate 212. When the lower thigh X is not dropped but remains in the clamping device 12, the lower thigh X is dropped from the clamping device 12 by the bone discharge guide 213 during the movement of the clamping device 12 to the first process station 1ST.

Note that, in the case where the prior deboning method is performed, in the tenth process station 10ST, the clamping device 12 is opened and the bone portion remaining in the clamping device 12 is dropped.

According to the deboning device 10 of the present embodiment, it is possible to perform two types of the deboning processes of the deboning method in which the work w is separated into the lower thigh X, the thigh meat m1, and the thigh bone j, and the prior deboning method in which the work w is separated into the bone portion and the meat portion. In addition, since the incision making of the thigh is performed in the second process station 2ST, the thigh meat m1 after the separation does not become tubular but is opened, and hence it is possible to form the thigh meat m1 into an attractive shape as deboned meat, and enhance the quality and the commercial value thereof. Further, it is possible to measure the knee joint length $L_N$ relatively easily by using the knee joint length measuring device 80 in the work loading section of the first process station 1ST, and accurately perform the positioning of the incision making knife 148 in the second process station 2ST based on the measured value.

In addition, in the second process station 2ST, since the entire length of the work w and the knee joint length $L_N$ are determined simultaneously, and the positioning of the cutting blade and the meat separator in the subsequent step is performed from the determined accurate entire length of the work and the determined accurate knee joint length $L_N$, it is possible to accurately separate the lower thigh X and the thigh Y from each other at the knee joint h. Consequently, the shape of each of the lower thigh X and the thigh Y does not vary, and it is possible to improve the yield of each of the lower thigh and the thigh.

Further, in the present embodiment, by allowing the ascent and the descent of the clamping device 12, it becomes possible to perform the deboning process with the fixed heights of the cutting blade and the meat separator in each process station. As a result, it is possible to perform the control of the cutting blade and the meat separator in each process station using a simple and low-cost mechanism. In addition, by controlling the height of the clamping device 12, it is possible to accurately perform the positioning of the work w.

Furthermore, in the fifth process station 5ST, since the strong tendon which connects the inside part of the knee joint and the thigh meat m1 is cut, it becomes easy to separate the lower thigh X from the thigh meat m1 by cutting. Moreover, in the seventh process station 7ST, by selecting cutting or non-cutting of the front of the knee joint by changing the number of the round blade cutters 188, it is possible to cause the cartilage to adhere to the thigh meat m1 or the thigh bone j. With this, the number of kinds of deboned meat can be increased.

In addition, in the eighth process station 8ST (final tearing), since the start point and the end point of the meat separator 184 are set from the entire length of the work w and the knee joint length $L_N$ determined in the second process station 2ST, it is possible to perform the separation of the thigh Y without any trouble. Further, in the ninth process station 9ST, when the thigh bone j is cut using the thigh bone cutting device 210, since the cutting is performed in the state where the work w is fixed on the mount 226 by using the holding plate 212 and the Y-shaped bar 216, the cutting of the thigh bone j is facilitated. Furthermore, after the clamping of the clamping device 12 is released, since the thigh bone j is cut in the state where the work w is pushed and inclined using the Y-shaped bar 216 and the ankle f is detached from the clamping device 12, it is possible to smoothly drop and discharge the lower thigh X and the thigh bone j after the cutting. In addition, it is possible to implement the automatic deboning device which separates the work w into the lower thigh X and the thigh meat m1.

According to the present invention, it is possible to implement the deboning technique capable of deboning the bone-in leg and providing the bone-in lower thigh and the thigh meat having high quality and commercial value.

What is claimed is:

1. A device for deboning a bone-in leg comprising:
   a clamping device which suspends a bone-in leg formed by a lower thigh and a thigh via an ankle;
   a conveying device which sequentially conveys the clamping device to a plurality of process sections;
   a knee joint length measurement section which measures a knee joint length of the bone-in leg from a clamping position of the clamping device to a knee joint;
   a thigh incision making section which determines an incision making start point based on the knee joint length measured in the knee joint length measurement section and makes an incision in the thigh from the knee joint to a head of a thigh bone in a longitudinal direction;
   a meat portion cut section which determines a cut position based on the knee joint length measured in the knee joint length measurement section and separates lower thigh meat and thigh meat from each other by cutting at a part of the knee joint;
   a thigh meat separation section which determines a position of a meat separator based on the knee joint length measured in the knee joint length measurement section and separates the thigh meat from the thigh bone; and
   a thigh bone separation section which cuts the thigh bone from the lower thigh.

2. The device for deboning a bone-in leg according to claim 1, wherein
   the knee joint length measurement section includes:
   a bending member which bends the bone-in leg at the knee joint;
   a measuring member which descends from the clamping position of the clamping device to an inside part of the knee joint bent by the bending member; and
   a measuring unit which measures a descent amount of the measuring member.

3. The device for deboning a bone-in leg according to claim 1, wherein
   the conveying device includes a mechanism which allows ascent and descent of the clamping device, and
   the knee joint length measurement section includes:
   a measuring member which comes in contact with a surface of the bone-in leg;
   an entire length measuring unit which measures a lower end position of the bone-in leg from two-dimensional coordinates of the measuring member which fluctuate in response to the ascent and the descent of the clamping device, and measures an entire length of the bone-in leg from the clamping position of the clamping device and the lower end position of the bone-in leg; and
   a knee joint length calculating unit which calculates the knee joint length from the entire length of the bone-in leg measured in the entire length measuring unit and collected data on a ratio between a length of the lower thigh and a length of the thigh.

4. The device for deboning a bone-in leg according to claim 3, wherein the thigh bone separation section sets a start point and an end point of the meat separator from the entire length of the bone-in leg measured in the entire length measuring unit and the knee joint length determined in the knee joint length calculating unit.

5. The device for deboning a bone-in leg according to claim 1, wherein
   the thigh bone separation section includes:
   a mount on which the bone-in leg is placed in a state where the thigh bone is bent relative to the lower thigh;
   a fixing member which fixes the bone-in leg placed on the mount from both sides; and
   a cutting blade which travels between the fixing member and the mount and cuts the thigh bone from the bone-in leg.

6. A method for deboning a bone-in leg which performs a deboning process while suspending the bone-in leg formed by a lower thigh and a thigh via an ankle, the method comprising:
   a knee joint length measurement step of measuring a knee joint length of the bone-in leg from a clamping position of a clamping device to a knee joint;
   a thigh incision making step of determining an incision making start point based on the knee joint length measured in the knee joint length measurement step and making an incision in the thigh from the knee joint to a head of a thigh bone in a longitudinal direction;
   a meat portion cut step of determining a cut position based on the knee joint length measured in the knee joint length measurement step and separating lower thigh meat and thigh meat from each other by cutting at a part of the knee joint;
   a thigh meat separation step of determining a position of a meat separator based on the knee joint length measured in the knee joint length measurement step and tearing the thigh meat from the thigh bone; and
   a thigh bone separation step of cutting the thigh bone from the lower thigh.

7. The method for deboning a bone-in leg according to claim 6, wherein
   the knee joint length measurement step includes:
   a bending step of bending the bone-in leg at the knee joint; and
   a measurement step of causing a measuring bar to descend from the clamping position of the clamping device to an inside part of the bent knee joint and measuring a descent amount of the measuring bar.

8. The method for deboning a bone-in leg according to claim 6, wherein
the knee joint length measurement step includes:
a first step of bringing a measuring member into contact with a surface of the bone-in leg;
a second step of measuring an lower end position of the bone-in leg from two-dimensional coordinates of the measuring member which fluctuate in response to ascent and descent of the clamping device;
a third step of measuring an entire length of the bone-in leg from the clamping position of the clamping device and the measured lower end position of the bone-in leg; and
a fourth step of calculating the knee joint length from the measured entire length of the bone-in leg and collected data on a ratio between a length of the lower thigh and a length of the thigh, and
the thigh incision making step and the knee joint length measurement step are performed simultaneously while the bone-in leg is lifted.

9. The method for deboning a bone-in leg according to claim 6, wherein the meat portion cut step includes a step of cutting a tendon which connects an inside part of the knee joint and the thigh meat.

* * * * *